(12) United States Patent
Kamm et al.

(10) Patent No.: US 11,790,002 B2
(45) Date of Patent: Oct. 17, 2023

(54) NETWORK GRAPH AND PROCESS OF BUILDING A NETWORK GRAPH FOR APPRECIATION MESSAGING

(71) Applicant: APPLIED GRATITUDE INC. ("Thnks"), New York, NY (US)

(72) Inventors: Brendan Kamm, New York, NY (US); Michael Yoon, New York, NY (US)

(73) Assignee: APPLIED GRATITUDE INC. ("THNKS"), New York, NY (US)

( * ) Notice: Subject to any disclaimer, the term of this patent is extended or adjusted under 35 U.S.C. 154(b) by 18 days.

(21) Appl. No.: 17/698,003

(22) Filed: Mar. 18, 2022

(65) Prior Publication Data
US 2022/0300559 A1 Sep. 22, 2022

Related U.S. Application Data

(60) Provisional application No. 63/163,097, filed on Mar. 19, 2021.

(51) Int. Cl.
*G06F 16/9535* (2019.01)
*G06F 16/901* (2019.01)
*H04L 51/52* (2022.01)

(52) U.S. Cl.
CPC ...... *G06F 16/9024* (2019.01); *G06F 16/9535* (2019.01); *H04L 51/52* (2022.05)

(58) Field of Classification Search
CPC .................. G06F 16/9024; G06F 16/9535
See application file for complete search history.

(56) References Cited

U.S. PATENT DOCUMENTS

| | | | |
|---|---|---|---|
| 7,512,612 B1* | 3/2009 | Akella | H04L 51/52 |
| 2010/0191586 A1* | 7/2010 | Veeramachaneni | G06Q 30/06 |
| | | | 705/14.1 |
| 2014/0019225 A1* | 1/2014 | Guminy | G06Q 30/02 |
| | | | 705/14.39 |
| 2014/0115010 A1* | 4/2014 | Seth | G06F 16/9024 |
| | | | 707/798 |
| 2015/0026120 A1* | 1/2015 | Chrapko | G06F 16/9024 |
| | | | 707/748 |
| 2020/0183997 A1* | 6/2020 | Wang | H04L 51/52 |

* cited by examiner

*Primary Examiner* — Grace Park
(74) *Attorney, Agent, or Firm* — Buckley, Maschoff & Talwalkar LLC

(57) ABSTRACT

The example embodiments are directed to a system and method that can determine an appreciation capability of an individual based on their interactions via a messaging platform with other users. The appreciation capability can also be based off of organizations that the individual is involved with. Furthermore, the appreciation capability can be used to make recommendations to the individual as well as recommendations to other users about improving their appreciation capabilities.

14 Claims, 12 Drawing Sheets

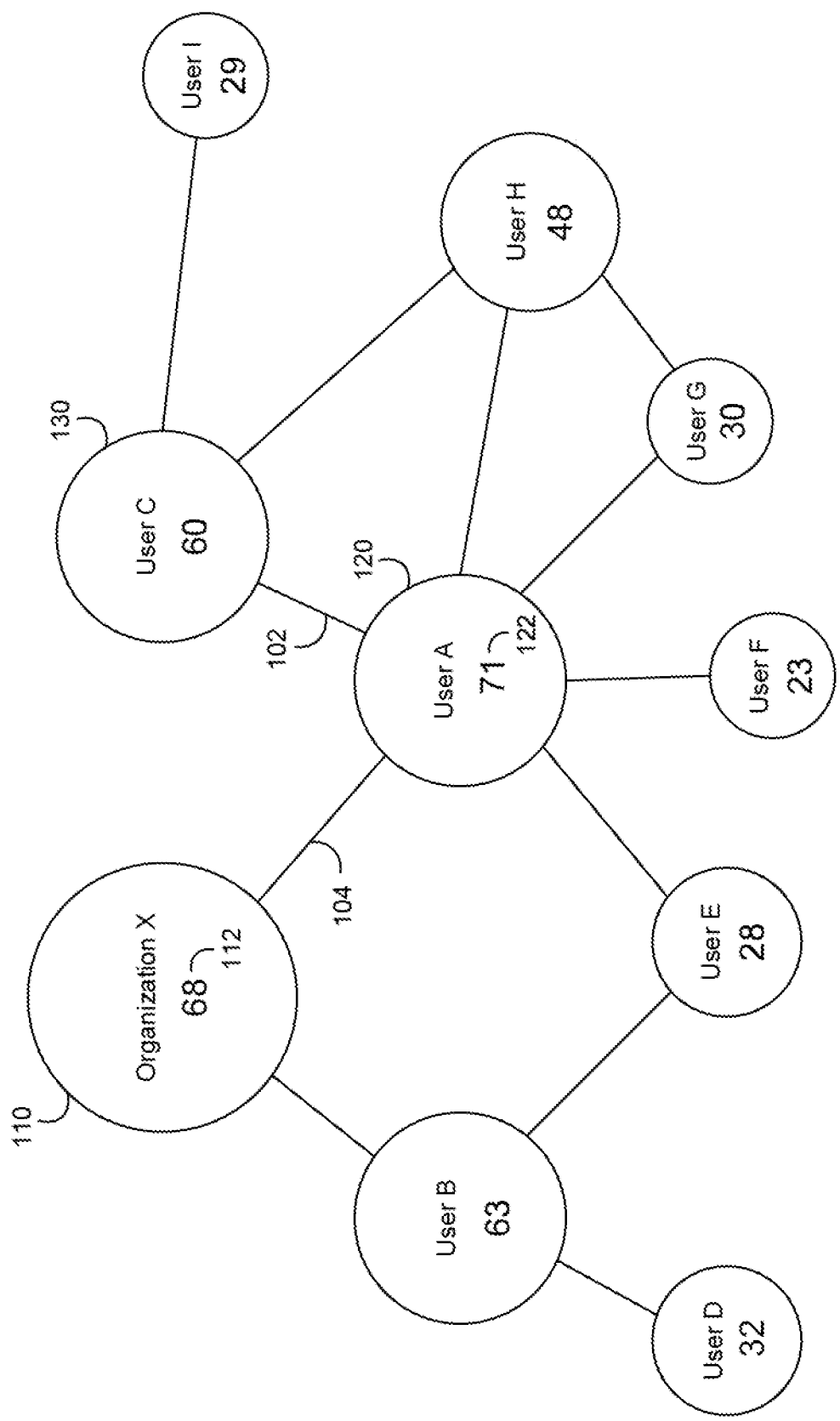

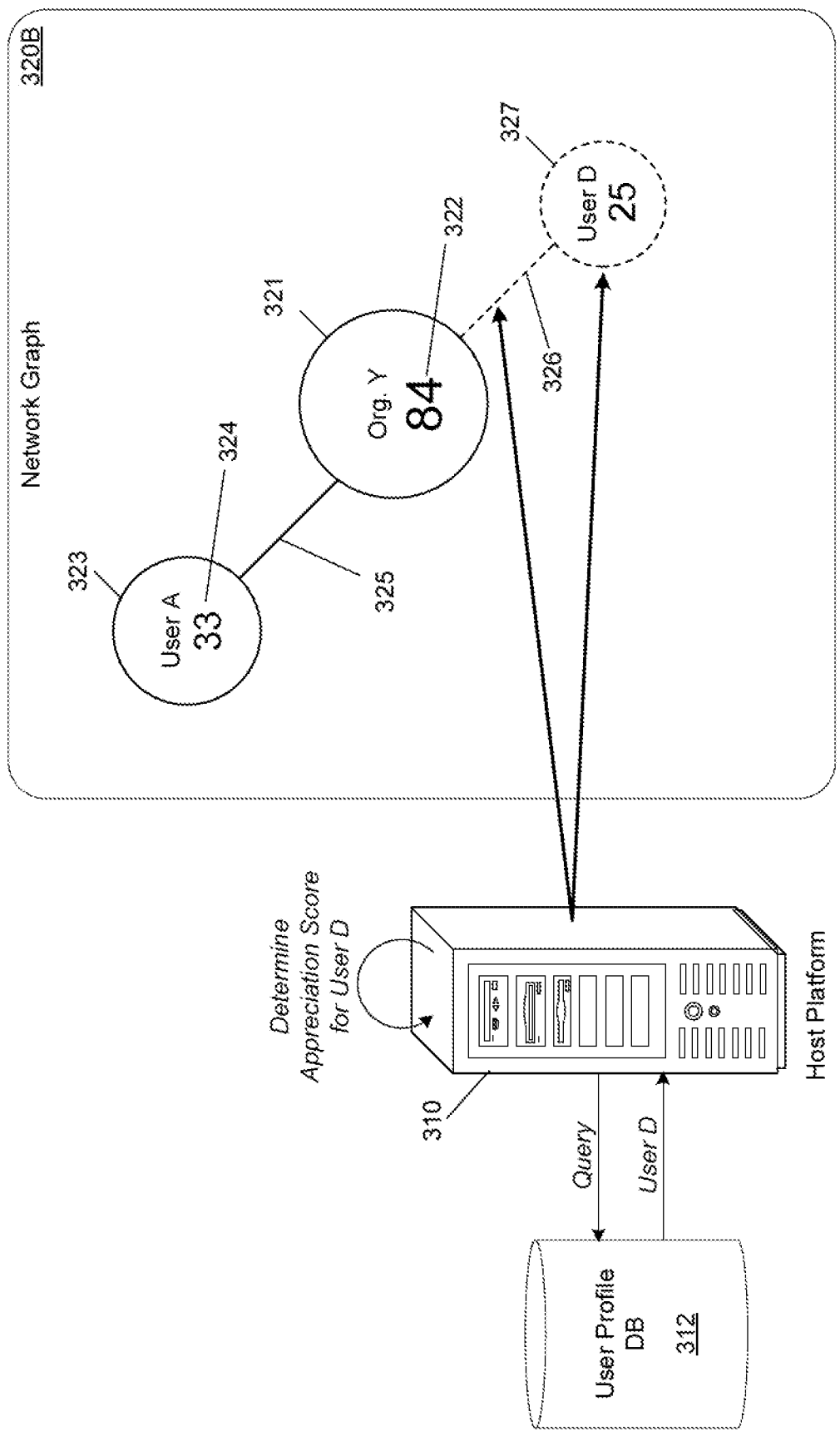

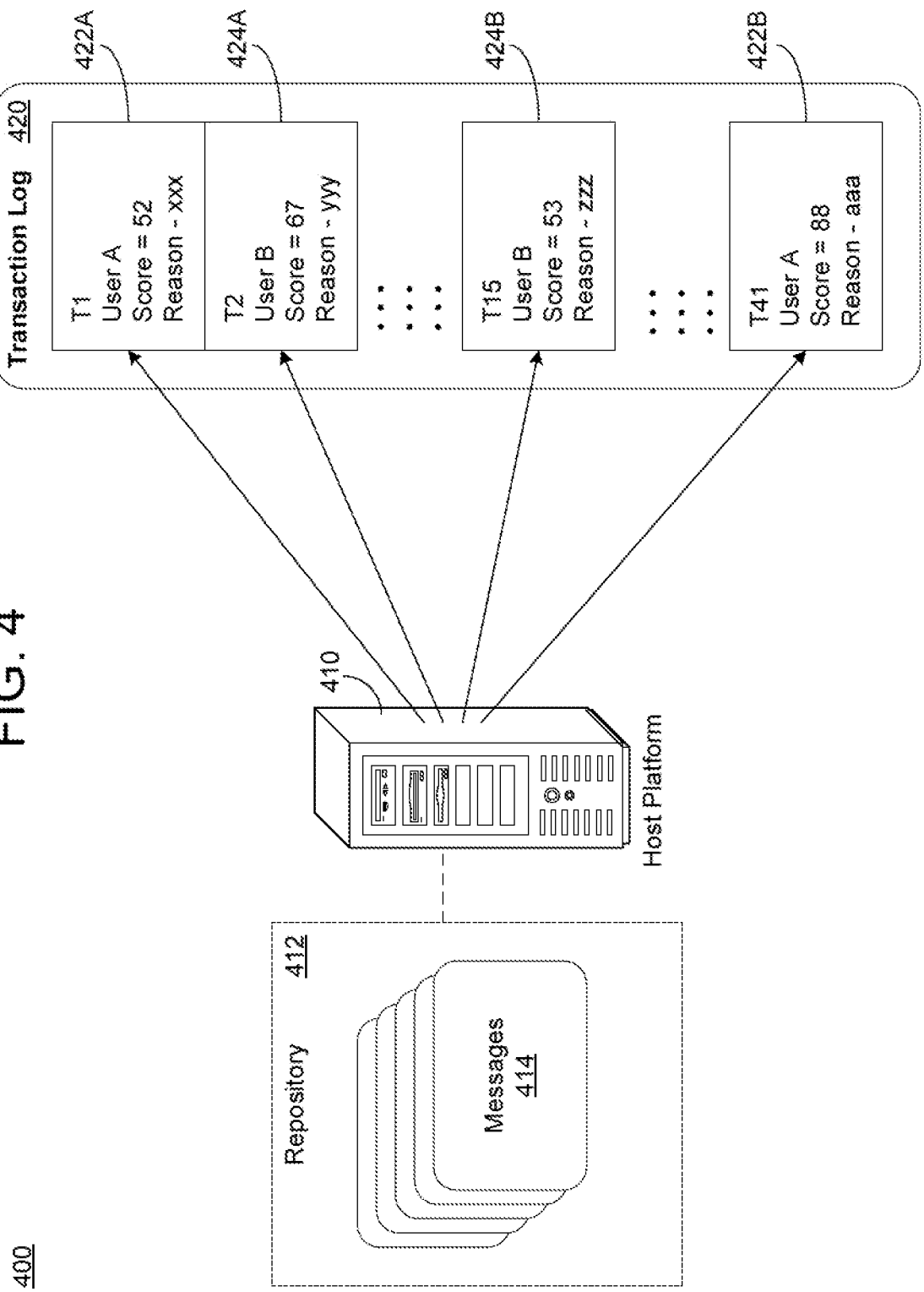

NETWORK GRAPH AND PROCESS OF BUILDING A NETWORK GRAPH FOR APPRECIATION MESSAGING

CROSS-REFERENCE TO RELATED APPLICATIONS

The present application claims the benefit under 35 USC § 119(e) of U.S. Provisional Patent Application No. 63/163,097, filed on Mar. 19, 2021, in the United States Patent and Trademark Office, the entire disclosures of which are hereby incorporated for all purposes.

BACKGROUND

Websites such as LinkedIn and Facebook provide information about the number of contacts/friends that a user has. This metric by itself, however, is not a very good indicator of the "quality" of these relationships. This is because the number of contacts/friends is just one scalar aspect. For example, this aspect fails to consider how frequent the two friends communicate, the degree of communication, etc. While a user may have acquired over five hundred connections on LinkedIn, these connections may be people the user has only met once, or people the user has never met directly.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 1A is a diagram illustrating an interconnected graph of nodes representing connections among users of an application according to an example embodiment.

FIGS. 3A-3C are diagram illustrating a process of monitoring messages exchanged between users of a software application and building an interconnected graph of nodes according to example embodiments.

FIG. 4 is a diagram illustrating a process of updating an appreciation capability via a transaction log according to example embodiments.

Figure 1B:
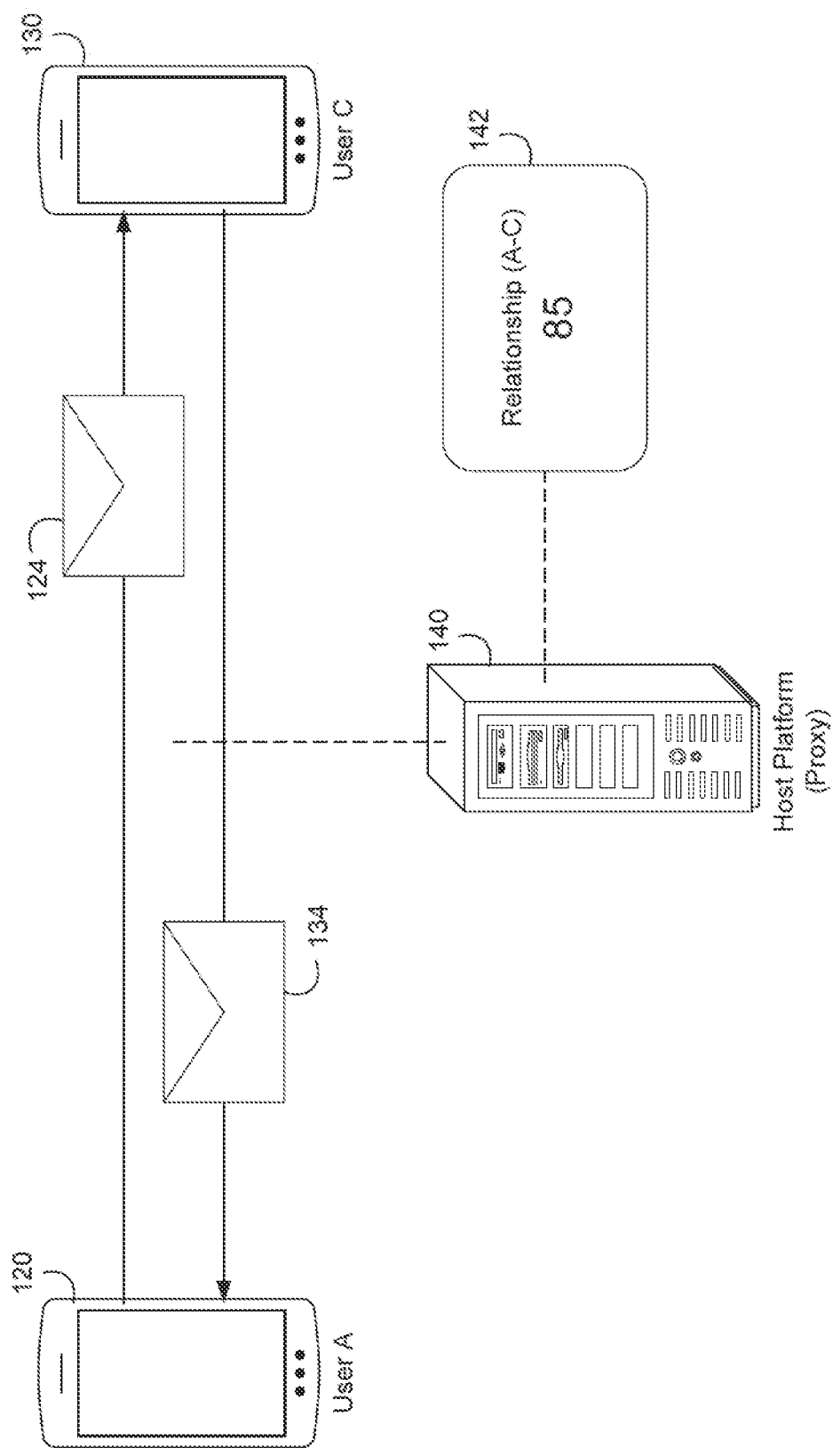
FIG. 1B is a diagram illustrating a process of determining an appreciation capability of a user according to an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, details are set forth to provide a thorough understanding of various example embodiments. It should be appreciated that modifications to the embodiments will be readily apparent to those skilled in the art, and generic principles defined herein may be applied to other embodiments and applications without departing from the spirit and scope of the disclosure. Moreover, in the following description, numerous details are set forth as an explanation. However, one of ordinary skill in the art should understand that embodiments may be practiced without the use of these specific details. In other instances, well-known structures and processes are not shown or described so as not to obscure the description with unnecessary detail. Thus, the present disclosure is not intended to be limited to the embodiments shown, but is to be accorded the widest scope consistent with the principles and features disclosed herein.

The example embodiments are directed to a host platform that hosts a message sending platform enabling users to send "gifts" and other forms of appreciation to other users via an application such as a mobile application, a web-based application, and the like. The gifts may be embedded inside a message that is transmitted from a sender to a receiver. Based on messages that are exchanged between the users of the application, the host platform may build an interconnected graph of nodes, also referred to herein as a network graph. The interconnected graph of nodes can represent users with nodes and relationships between the users with edges. The relationships may be identified based on the messages that are sent. By building the graph, the graph can subsequently be stored in a database, such as a graph database, and queried for additional data.

In some embodiments, the host platform may establish a relative scoring mechanism standard that can be used to measure and compare the "appreciation" capability (appreciation score) of individuals and organizations. The appreciation score may indicate a user's ability to show appreciation to other users within an application hosted on the host platform. In some embodiments, the host platform may be a host of a web application, a mobile application, or the like, which provides gratitude-based messaging and gifts that can be sent between users of the mobile application, however, embodiments are not limited thereto. An example of a such a mobile application is the THNKS® mobile application.

The host platform may provide users of the application with the ability to send and receive items of value using a mobile number, an email, or the like. For example, via the application, the user may browse a list of items that can be sent in the form of gratitude to another user. The items may include items with different values such as gift cards, food, alcohol, tickets, and the like. The user may select an item from the list. The user may also browse a list of contacts in their account, and select a contact (or multiple contacts) from the list of contacts to send the selected item as a gesture of gratitude. Prior to sending the gratitude, the user may generate an electronic message with a personalized note to the recipient of the gift. The message (with the gift included therein) may be sent to the recipient (or multiple recipients) via electronic message (e.g., SMS, MMS, instant message, etc.), via email, and the like. In some cases, the gift may be a code that is embedded within the message. The recipient can use the code online or in-store to obtain the gift.

In the examples described herein, a portion of a user's appreciation score may be determined based on the relationships and the gifts that are exchanged via the application hosted by the host platform. Other factors include, but are not limited to, a frequency at which the user communicates with other users, a percentage of conversions/adoptions of recipients to become users of the application which expresses the "success" and influence of the sender's ability to positively impact the relationship, a semantic analysis of message content, response content, extent of customization of the gift messages and responses, and the like.

For example, a user may have different appreciation scores with respect to different contacts within the application The user may also receive a total appreciation score which is a value that is based on an aggregation or accumulation of all individual contacts (appreciation scores) between the user and other users, an organization that the user is apart of, and the like.

The example embodiments are based on the practical application of active relationship development. The host platform may generate a network graph in which organizations and users are connected to one another. In this example, the organizations and the users may be represented as nodes in the graph which are connected via links. Furthermore, values/weights may be added to the nodes, to the links, etc. to reflect the total appreciation scores of the users, total appreciation scores of the organizations, individual appreciation scores between users, individual appreciation scores between a user and an organization, and the like. Here, a number and quality score of relationship links in the network graph can be proxy for the appreciation capability of user.

In some embodiments, the host platform may recommend actions or changes to be made by a user in order to increase their appreciation score. For example, the host platform may identify a user within an organization that has a best score, a good score, etc. The system may also identify attributes of the user, for example, how often the user sends gratitude gifts, the content discussed within messages, the length of time that the user has had relationships, and the like. Here, the host platform may make recommendations to other users in the same organization or users in different organizations about how to improve their appreciation scores. Thus, the host platform can teach other users how to be appreciative to other users through the platform. Here, the host platform may suggest different types of gifts, message content to be used to customize messages, frequency of communications, and the like.

Each message/gift that is exchanged via the application may affect various appreciation scores. Recursive by nature, the weighting factor of the score of a transaction is partially determined by the score of the individuals involved. Likewise, the score of an organization can be determined by an aggregation of the individuals (much like PageRank of a site/domain vs individual pages).

The scoring process can be recursive in that a change to one entity's appreciation score may cause the appreciation score of other entities that are linked to the entity to go up or down based on the change. The algorithm may be customized to perform this process in any number of ways. For example, if the appreciation score of a first user changes by going up a predetermined amount, the system may also cause the appreciation scores of any other users or entities that are one-off linked to the first user to also have the scores go up. The scoring of the "linked" users may go up less than the score of the first user, for example, based on an algorithm.

In some embodiments, the scoring may include an inheritance or contribution between two or more entities that are linked to each other, such as an organization and a person. The principle may be similar to a page rank of a page and a relationship to a domain rank. In an example, a bidirectional contribution between the scoring of individual thoughtfulness between a first entity (e.g., between a user) and that of a linked entity, such as a company (e.g., the organization where the user is employed, etc.) The details of the amount of contribution that one has on the other may be configured differently. As just one example, the appreciation score of the organization may be a normalized aggregation of the scores of the participants (e.g., employees, etc.) of the organization, with a different decay factor than an individual. And similarly, the reputation or goodwill of the organization may have a weighted impact on the user who is a participant (employee) of the company.

Thus, the host platform may quantify the appreciation capability of a person (or organization) based on the different relationships they have with other users. Here, the host platform may quantify a relationship between two people (or a person and a company). While LinkedIn, Facebook, etc. list the total number of connections/friends, this is not a very good indicator of the "strength" of those connections/friends. The example embodiments go well beyond a number of contacts/connections and tries to quantify how strong a relationship is by looking at the message content, gifts, frequency of communication, etc. between two people. The host platform may perform this same relationship assessment for all of the relationships a user has (with many different users). The system accumulates these quantified relationship values into an "appreciation score" which is a value that is a measure of the total appreciation of a user based on all of their relationships, etc.

The system may allow users to select and send curated gifts which are categorized with a tag value, or the like, representing a category of the gift (e.g., food, alcohol, entertainment, coffee, etc.). As another example, the gift may be described within a message of free-text. In this scenario, the system may identify the item of value being sent using various algorithms such as heuristics, expert rules (algorithm), machine learning, word analysis, natural language processing, and the like. The system may correlate the identified keyword to a category or to a relevant compliance policy/rule.

FIG. 1A illustrates a network graph 100A (e.g., also referred to as an interconnected graph of nodes) that represent users of an application with nodes and connections among the users with edges according to example embodiments. For example, the network graph 100A may be built by a host platform (e.g., an application host platform) which includes participants such as users A-I and organization X. Each user and organization may be mapped to a node in the network graph 100A. For example, organization X is mapped to node 110, user A is mapped to node 120, and user C is mapped to node 130. In addition, links 102 may be inserted between nodes to represent users that have direct messaging interaction with one another. That is, organizations and users may each be embodied as respective nodes in the same graph. Also, users may be linked to organizations and/or other users. For example, a user node may be linked to one or more organization nodes, one or more other users nodes, and the like.

Referring to FIG. 1A, link 102 represents that user A and user C have electronic communications between them. Meanwhile, a link 104 between a user (such as user A) and an organization, may indicate that the user is part of such organization, for example, an employee, a follower, etc. For example, the host platform may store an identifier of a parent node 110 (e.g., organization X) within a child node 120 (e.g., user A) thereby providing a pointer from the child node (user A) to the parent node (organization X), which may be embodied as an edge 104 in the network graph 100A. The identifier of the parent node 110 may include a unique identifier assigned by the application to the organization, a unique data attribute of a server or other computer associated with the organization X such as a URL, username, domain name, MAC address, or some other data value that can be used to uniquely identify the parent node 110 from other nodes in the network graph 100A, etc.

According to various embodiments, the host platform may monitor and analyze message content between the different users and determine individual appreciation capability scores of a user based on their interactions (messages, gifts, etc.) sent and exchanged with other users. For example, the host platform may execute one or more application programming interfaces (APIs) that require message content in a predefined format (defined by an API, etc.) and which can receive the messages from senders via the application. The host platform may accumulate messages between two particular users, for example, in a file, table, spreadsheet, XML file, JSON file, etc. The host platform may score an appreciation capability of each of the users based on message content, a frequency of communication, gifts exchanged, and the like. The individual score may be stored within the file.

Furthermore, the host platform may generate a total appreciation score. For example, an appreciation score 122 of user A may be determined and displayed within node 120, which indicates a total appreciation capability of the user A based on an accumulation of appreciation scores between all users that the user A interacts with. Furthermore, an organization, such as organization X, may receive a total appreciation score 112 which is displayed within node 110 and which indicates the accumulated appreciation capability values of the users that are linked to or otherwise apart of organization X. The network graph 100A may be built internally within the host platform and used for scoring purposes. Also, the network graph 110A may be displayed via a user interface in response to a request from a user, an admin, an organization, and the like.

The network graph 100A is similar to a search engine page rank model in which pages are connected to each other and weighted. The appreciation capabilities of users can be determined using a similar algorithm as a page ranking algorithm.

FIG. 1B illustrates a process 100B of determining an appreciation capability of a user according to example embodiments. In the example of FIG. 1B, an appreciation value 142 is determined between two users 120 and 130 (user A and user C). This appreciation value 142 represents strength of a quality of the relationship between the two users 120 and 130 as determined by a host platform 140 based on various attributes such as the content of the messages 124 and 134 sent between the two users 120 and 130, the frequency of communication between the two users 120 and 130, the previous communications between one of the users and other users, and the like. The host platform may store this information in a network graph such as shown in FIG. 1A. For example, the individual links 102 shown in FIG. 1A may include individual appreciation scores between two users, etc.

Figure 1C:
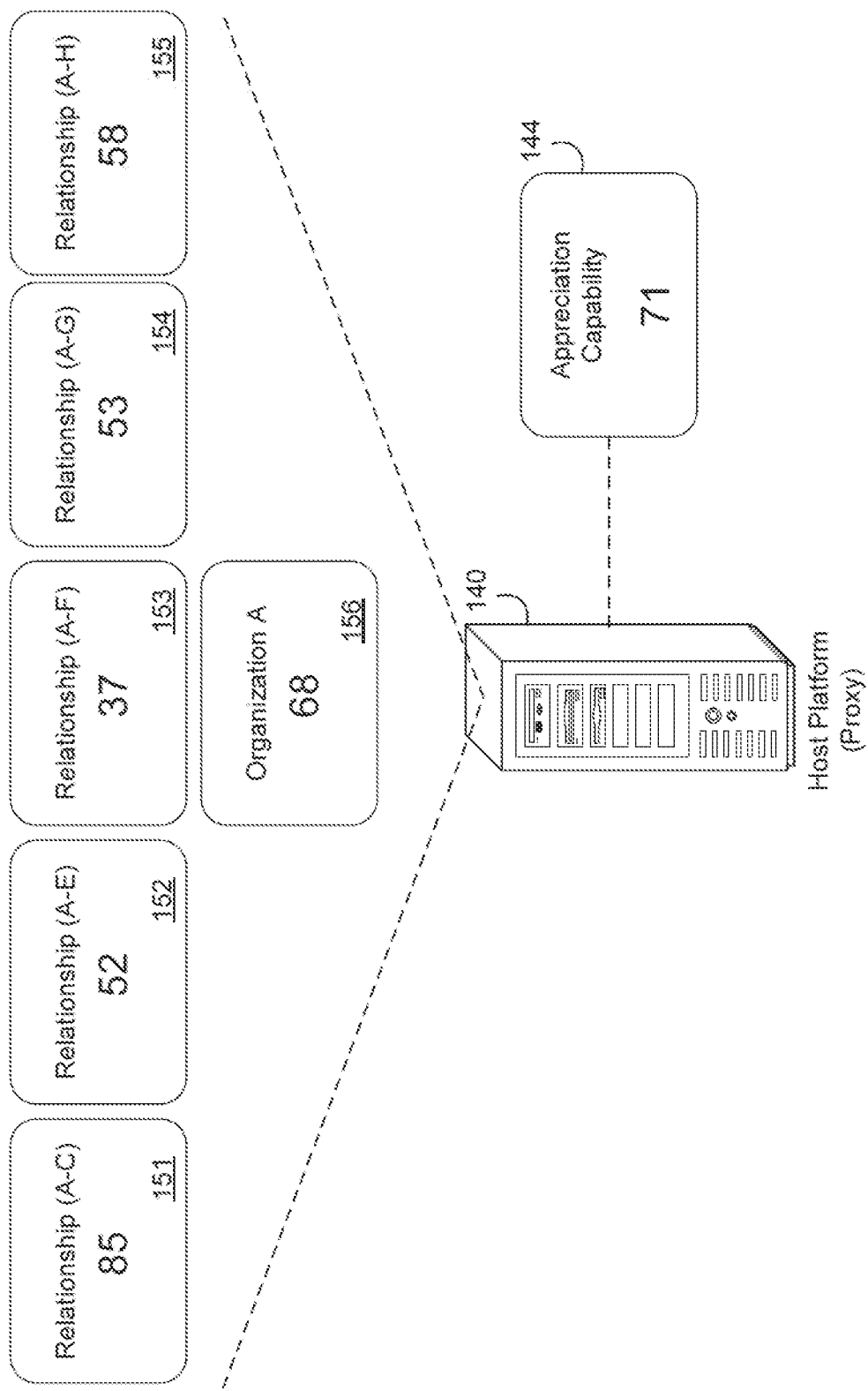
FIG. 1C is a diagram illustrating a process of determining an appreciation capability of a user according to another example embodiment.

FIG. 1C illustrates a process 100C of determining a total appreciation capability value 144 of a user according to another example embodiments. Referring to FIG. 1C, the host platform 140 may combine individual appreciate capability values 151, 152, 153, 154, and 155, between a user (user A) and a plurality of other users (users C, E, F, G, and H) as well as an organization appreciation capability value 156 to create the total appreciation capability value 144 of the user (user A). Here, an algorithm may be executed by the host platform 140 to combine or otherwise accumulate the individual appreciation capability values 151-155 and the organization appreciation capability value 156. Different weights, averages, aggregations, and the like, may be applied to different values, etc. In this example, the of determining an overall appreciation capability of a user (user A) based on multiple relationships and the organization they are apart of.

Figure 2A:
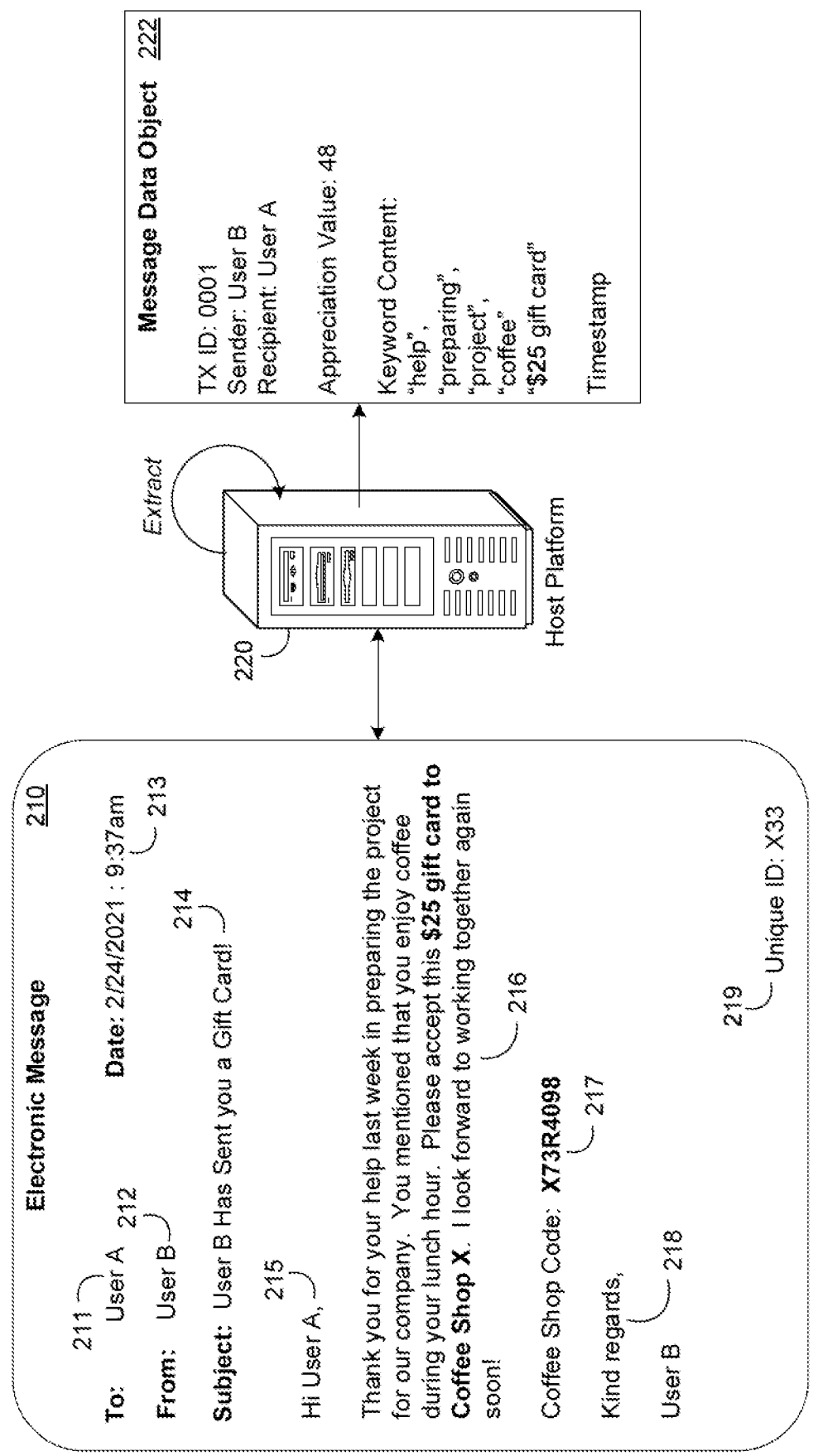
FIG. 2A is a diagram illustrating a process of identifying and extracting attributes of an electronic message according to an example embodiment.

FIG. 2A illustrates a process 200 of identifying and extracting attributes of appreciation from an electronic message 210 according to example embodiments. Referring to FIG. 2A, a host platform 220 may store electronic messages (including message 210) that are sent between users of an application hosted by the host platform 220. Here, the host platform 220 may analyze the message content to determine the appreciation capability values described in the examples of FIGS. 1A-1C. FIG. 2A illustrates a non-limiting example of an electronic message 210 which may be an instance message, a text message (SMS, MMS, etc.), an email, or the like which is transmitted from a sender to a recipient via the application described herein.

Here, the host platform 220 may extract message content from various predefined fields 211-218 of the message and store the string values from the predefined fields of the message within a data object 222, such as a table, a stream, a file, a directory, a document, or the like. The message objects can be accumulated and used to derive an appreciation capability value. The message may have a template with predefined fields. For example, field 211 stores a name of a recipient of the electronic message 210, field 212 stores a name of a sender of the electronic message 210, field 213 stores a timestamp at which the electronic message 210 is sent, field 214 stores a subject line of the electronic message 210, field 215 stores a greeting, field 216 stores a body of message content, description, etc., which may include text and other alphanumeric values that can be customized by a sender, field 217 stores an identification of a gift included in the electronic message 210, and field 218 stores a salutation of the message.

According to various embodiments, the electronic message 210 may have a unique identifier 219 that is embedded therein or otherwise included in the metadata of the electronic message 210. The unique identifier 219 may be used by the host platform 220 to identify default content of the electronic message 210. The default content may include a message body that is automatically provided by the host platform 220 when the sender selects the type of gift to be sent. The host platform 220 may store a mapping between unique identifiers and default message content of particular gifts. Each of the attributes extracted from the electronic message 210 may be stored in the message data object 222. Furthermore, the message data object 222 may be assigned a unique identifier that identifies the message from other messages of the user.

Here, the host platform 220 may identify the default message content of the electronic message 210 (associated with the gift 217) and compare it to the actual content extracted from the body of the message included in the field 216 to determine a degree of customization. The host platform 220 may also perform a semantic analysis on the extracted content from the field 216 to identify various keywords.

Furthermore, the host platform 220 may generate an appreciation score (appreciation capability value) between the sender the receiver based off of the degree of customization and the semantic analysis of the message content. In addition, all of the attributes extracted from the fields 211-218 of the electronic message 210 may be used in determining an appreciation capability value between the sender and the receiver. The appreciation value may be stored within the message data object 222.

Figure 2B:
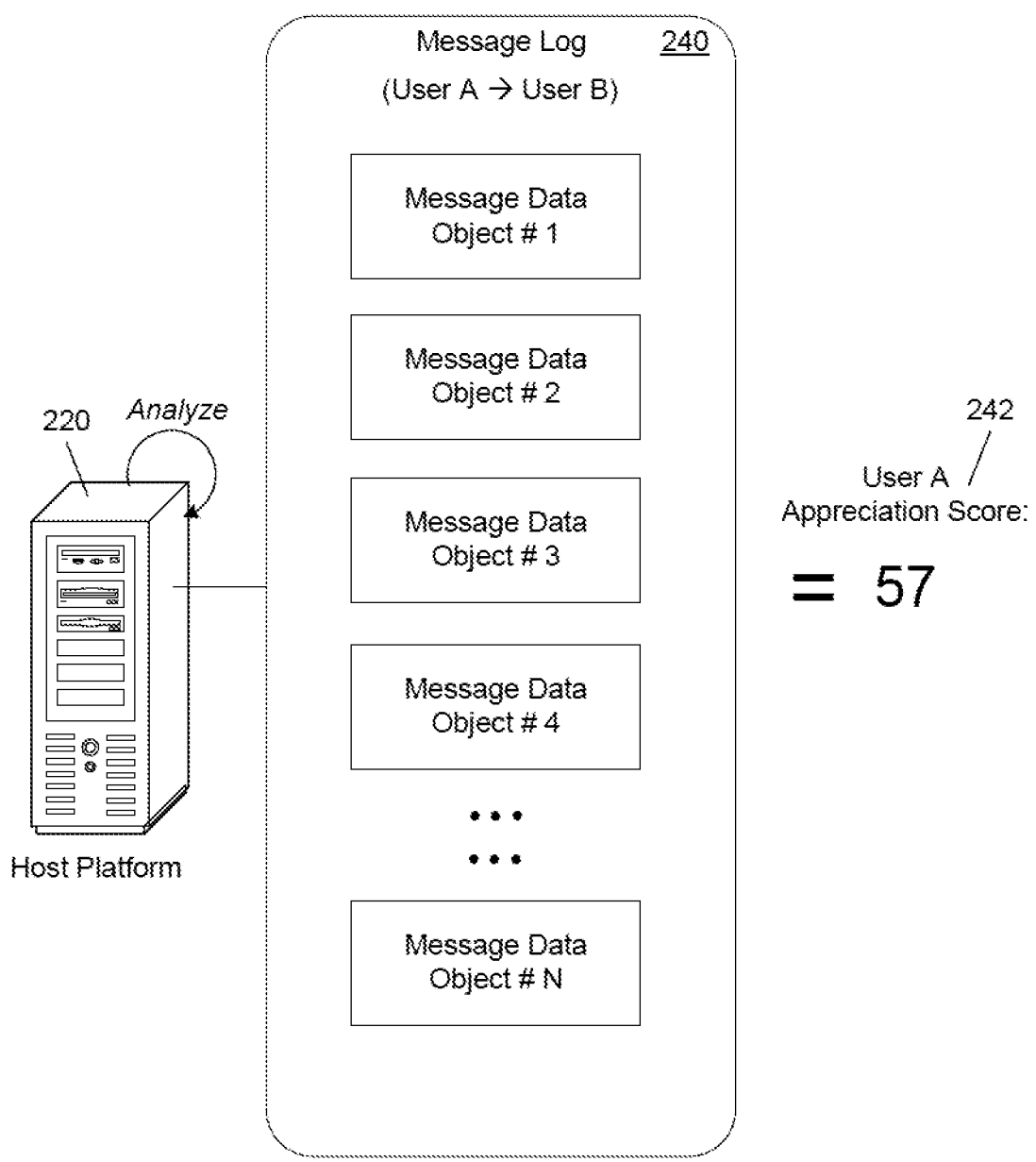
FIG. 2B is a diagram illustrating a process of generating an appreciation value based on message content between users according to an example embodiment.

FIG. 2B illustrates a process 230 of generating an appreciation value 242 of a user based on message content between the user and one or more other users according to an example embodiment. Referring to FIG. 2B, the message content of between a target user (user A) and one other user (user B) may be used to generate an appreciation value for the target user (user A). In this example, an aggregation of messages sent from the target user to the other user can be stored in a message log 240. Next, an appreciation value 244 for the target user may be determined based on the aggregation of messages between the target user and the other user. The message content (e.g., keywords), the frequency between the messages (e.g., identified from the timestamps in the message objects, etc.), appreciation values assigned to the messages, etc. may be used to create an overall appreciation value 242 for the target user with respect to the other user.

Although not shown in FIG. 2B, if the target user also has interactions with other users in the application, the host platform 220 may create respective appreciation values for the target user with respect to the other user(s) and then create an overall appreciation value for the target user based on the combination of appreciation values for the target user with all users.

Figure 3A:
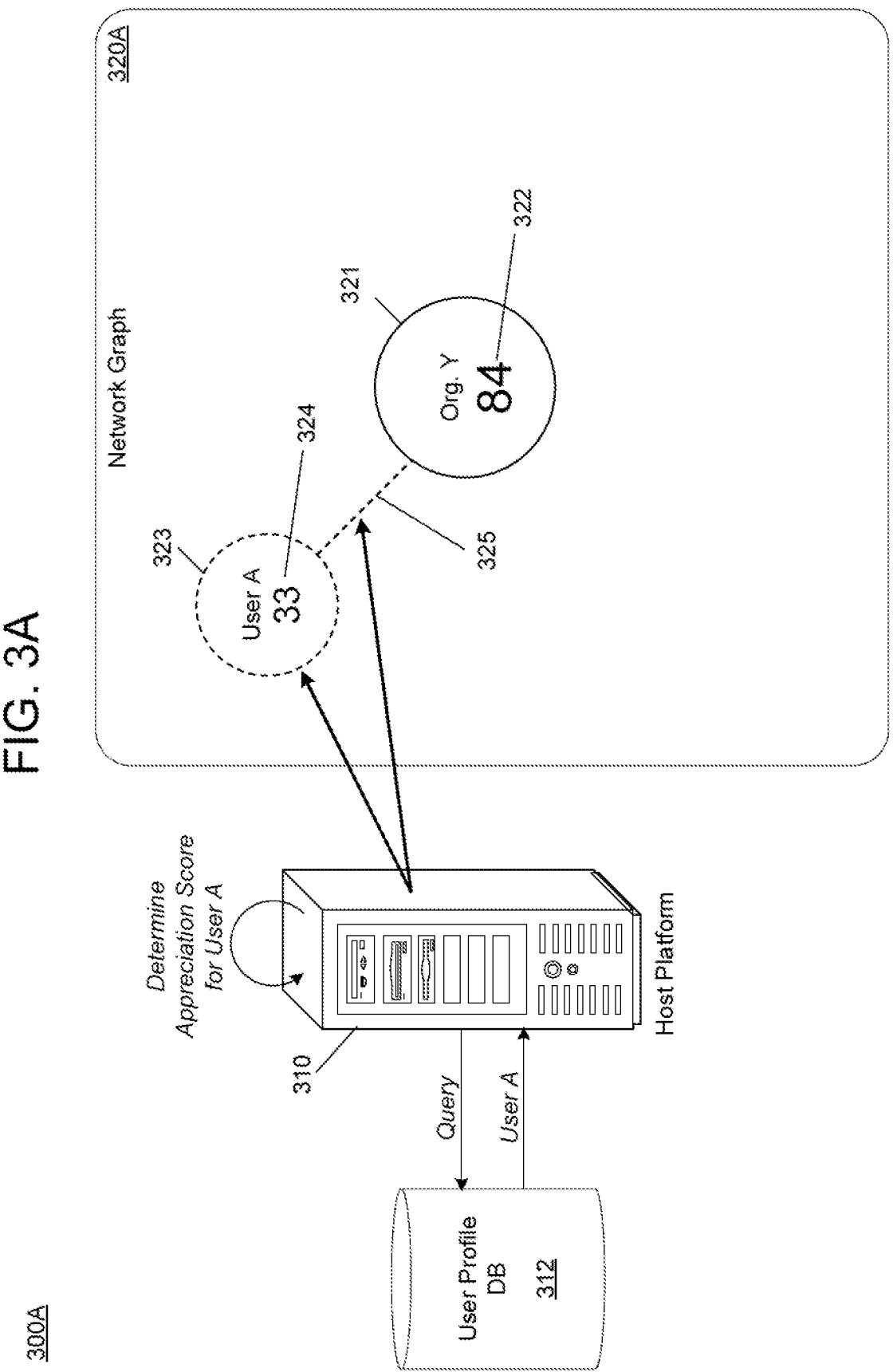
Figure 3C:
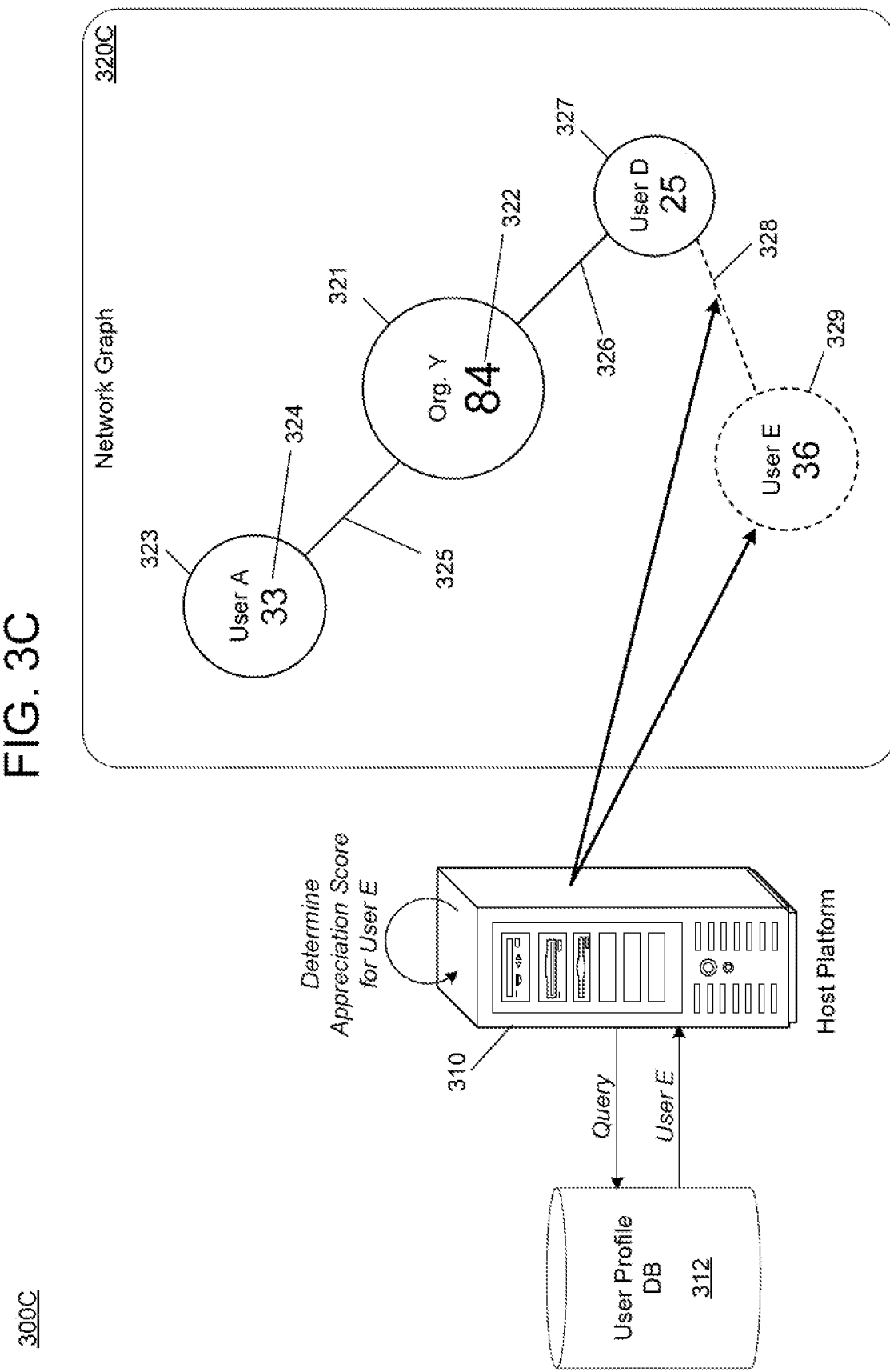

FIGS. 3A-3C illustrate a process of monitoring messages exchanged between users of a software application and building an interconnected graph of nodes according to example embodiments. Referring to FIG. 3A, there is illustrated a process 300A of a host platform 310 inserting a new node 323 of a new user into a network graph 320A of an application based on a connection of the new user to an organization that is represented by a node 321. For example, the relationship can be identified from a user profile of the user which is stored in a database 312. Here, the host platform 310 may query the database 312 (such as a user profile database) at the same time that the appreciation value for the new user is generated to determine relations of the new user such as organizations and/or other users.

In this case, the host platform 310 determines that the new user is an employee of the organization represented by node 321 in the network graph 320A and adds a link 325 between the new node 323 of the new user and the existing node 321 of the organization. In addition, values 322 and 324 can be stored inside the nodes and may include the appreciation score, keywords from the messages, message frequency data, and the like.

As more users join the application, more new nodes of users and organizations may be added to the network graph. Referring to FIG. 3B, there is shown a process 300B of adding a second new user as a new node 327 representing the second new user to a network graph 320B. Here, the host platform 310 may query the database 312 for the user profile of the second new user and use the combination of user data in the user profile and appreciation data of historical messages of the second new user to generate and arrange the new node 327 within the network graph 320B.

In this example, the second new user is also related to the same organization (represented by the node 321) which was previously linked to the first user (represented by node 323). Therefore, an additional edge 326 (link) may be established within the network graph 320B between the new node 327 and the node 321 represented by the organization. In this example, the second new user does not communicate directly with the first user, therefore, they are not connected to each other in the network graph 320B. As more users are added, more nodes can be added to the graph as well.

Referring to FIG. 3C, there is shown a process 300C of adding a third new user as a new node 329 to a network graph 320C. As in the previous examples, the host platform 310 may query the database 312 for a user profile of the third new user and use this information to determine a position at where to arrange the new node 329 in the network graph 320C, and also the content to embed in the new node 329 such as the appreciation value of the third new user, message content, message frequency, etc. In this example, the third new user is directly connected to the second new user added as the new node 327 in the example of FIG. 3B. Here, a link 328 is added to connect the new node 329 of the third new user with the existing node 327 of the second new user. This process may be repeated each time new users are added to the application. Also, over time, the appreciation values within the nodes may be updated when the appreciation capabilities of the individual users and organizations change.

FIG. 4 illustrates a process 400 of updating an appreciation capability via a transaction log according to example embodiments. For example, the process 400 may be performed by a host platform 410 that hosts an appreciation-based application such as a web application, mobile application, and the like. The host platform 410 may be part of a network of devices, or a stand-alone system, that manages a transaction log 420 such as a linked-list, a blockchain (hash-linked chain of blocks), a document, or the like. The transaction log 420 may keep a growing list of transactions where each transaction includes information about an appreciation capability value of a user. In this example, the transaction log 420 may keep track of a history of changes (i.e., updates) to a corporation or a user's appreciation capability value.

Referring to FIG. 4, the host platform 410 can store or otherwise access a repository 412 which includes messages 414 exchanged between users of the application hosted by the host platform 410. The host platform 410 may analyze the messages 414 and generate an initial appreciation capability value for a user (or an organization). Once an initial appreciation capability value has been stored for the user, the host platform 410 may update the previously-stored appreciation capability value for the user when new messages are exchanged. Here, the host platform may analyze the message content, the message frequency, the task (e.g., business or personal, etc.) and increase or decrease the user's appreciation capability value.

In FIG. 4, the host platform 410 analyzes message content exchanged between user A and user B and generates a total appreciation capability value for each of the users. Here, a first transaction 422A is stored for user A and a second transaction 424A is stored for user B. The transactions each include a timestamp (T1, T2), an identifier of the user, an appreciation capability value (score), and reasons which may include a text description of why the appreciation capability value is what it is. Over time, the users A and B may interact with other users on the application.

In this example, user B's appreciation capability value is decreased by the host platform 410 based on a decay factor or other attributes. For example, the host platform 410 may employ a decay factor which is a model representing the natural decay of a relationship over time. Other reasons for a drop/decrease in the appreciation capability value include poor reception (not thoughtful), not appreciated, reduced frequency. In particular, a transaction 424B is stored by the host platform 410 on the transaction log 420, and includes a decrease in user B's appreciation capability value. In addition, the transaction 424B may include a description of the reason for the decrease such as a description of the decay, why it decayed, how long the decay has occurred, and the like.

Meanwhile, user A's appreciation capability is increased by the host platform 410 and stored as a transaction 422B on the transaction log 420. Similar to the decay factor, the host platform 410 may also model an ideal appreciation capability. As users continue to send messages on the platform the users may increase their capability by adding more customized content, better expressions of thoughtfulness, additional gifts, and the like.

By using a transaction log 420, the history of user A and user B can be subsequently examined by processes on the host platform 410 when suggesting recommendations to other users. Here, the host platform 410 can analyze the transaction log 420 and identify which "reasons" have previously caused user A's score to go up and make those suggestions to another user (such as user B, etc.).

Figure 5:
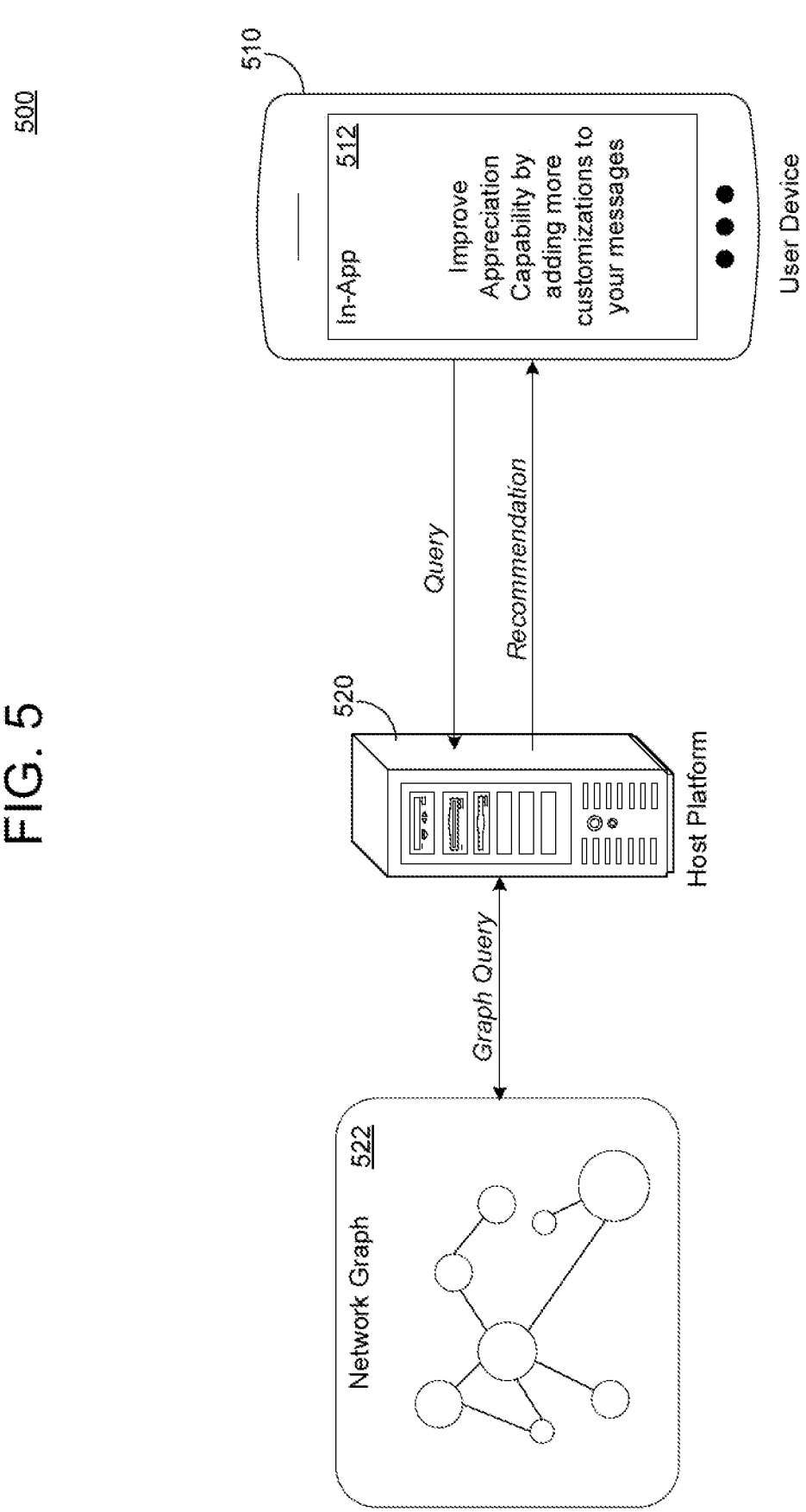
FIG. 5 is a diagram illustrating a process of generating a recommendation based on the interconnected graph according to an example embodiment.

FIG. 5 illustrates a process 500 of generating a recommendation to a user based on appreciation capabilities of another user according to example embodiments. According to various embodiments, a host platform 520 may analyze the appreciation capability values of a plurality of users by traversing a network graph 522 such as the network graph shown in FIG. 1A, and built in the examples of FIGS. 3A-3C, and provide recommendations for users to take to improve their appreciation value based on the message content/data stored in the network graph along with the appreciation values stored in the network graph. As an example, the host platform 520 may receive a direct query from another user with a request for such information. As another example, the host platform 520 may automatically identify a lowest appreciation score of a group of related users (e.g., users in the same organization, etc.) and use other related users and their actions to make suggestions to the user.

In response, the host platform 520 may query the network graph 522 for suggested appreciation actions such as sending a type of gift, changing a frequency of communication, changing the content of the messages that are sent by the user, and the like. For example, the host platform 520 may query the network graph 522 via a graph query or the like and generate a recommendation and output the recommendation on a user interface 512 of a user device 510 of a user who currently has a low appreciation capability value. As another example, the host platform 520 may identify certain users within an organization that have the greatest or one of the greatest appreciation capability values in the organization, and make recommendations to other users in that same organization on how to improve their appreciation capability values based on message content, message frequency, and the like of the user having the greatest appreciation capability value.

Figure 6:
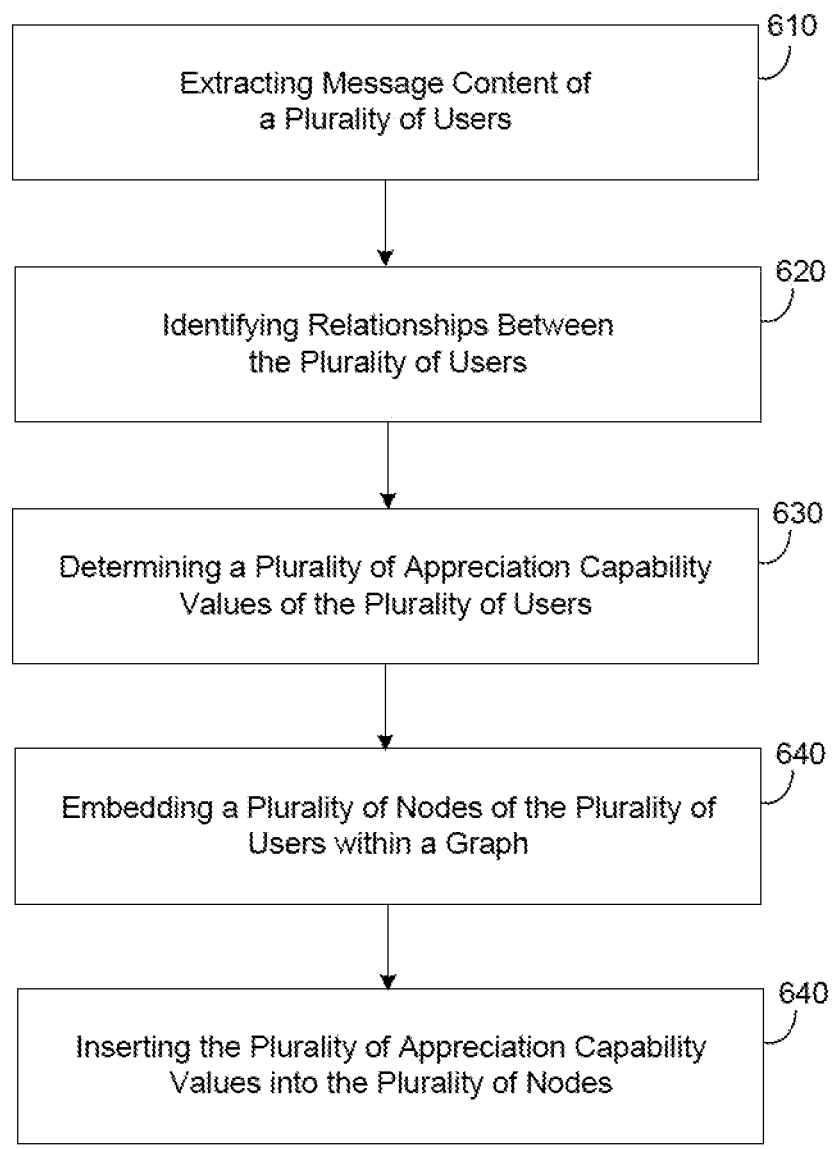
FIG. 6 is a diagram illustrating a method of building an interconnected graph based on message content and appreciation according to an example embodiment.

FIG. 6 illustrates a method 600 of building an interconnected graph based on message content and appreciation according to an example embodiment. Referring to FIG. 6, the method may include extracting, via a software application, message content from electronic messages that are exchanged between a plurality of users of the software application, in 610. In 620, the method may further include identifying relationships between the plurality of users of the software application based on the electronic messages that are exchanged between the users. In 630, the method may further include determining a plurality of appreciation capability values of the plurality of users, respectively, based on the message content. In 640, the method may further include embedding a plurality of nodes representing the plurality of users into a graph and interconnecting the plurality of nodes with edges based on relationships between the users and appreciation values. In 650, the method may further include inserting the plurality of appreciation capability values into the plurality of nodes, respectively, within the graph.

In some embodiments, the method may further include receiving a search query for a recommended action, and querying the graph for suggested actions to improve an appreciation capability of a user associated with the search query. In some embodiments, the generating the recommendation may include identifying one or more other users that have a greater appreciation capability value in the graph, retrieving message content of the one or more other users, identifying an action to perform based on the retrieved message content, and transmitting the action to perform to the user via the software application.

In some embodiments, the extracting may include extracting message data from one or more of a short message service (SMS) message and an electronic mail (e-mail) based on an application programming interface (API) of the software application. In some embodiments, the method may further include dynamically sizing each respective node among the plurality of nodes based on an appreciation capability value determined for an entity represented by the respective node.

In some embodiments, the embedding may further include embedding nodes representing organizations into the graph, and adding edges between the plurality of nodes and the nodes representing the organizations based on relationship between the plurality of users and the organizations. In some embodiments, the method may further include updating an existing node of a target user among the plurality of nodes in the graph based on one or more new messages sent by the target user via the software application.

The above embodiments may be implemented in hardware, in a computer program executed by a processor, in firmware, or in a combination of the above. A computer program may be embodied on a computer readable medium, such as a storage medium or storage device. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 7:
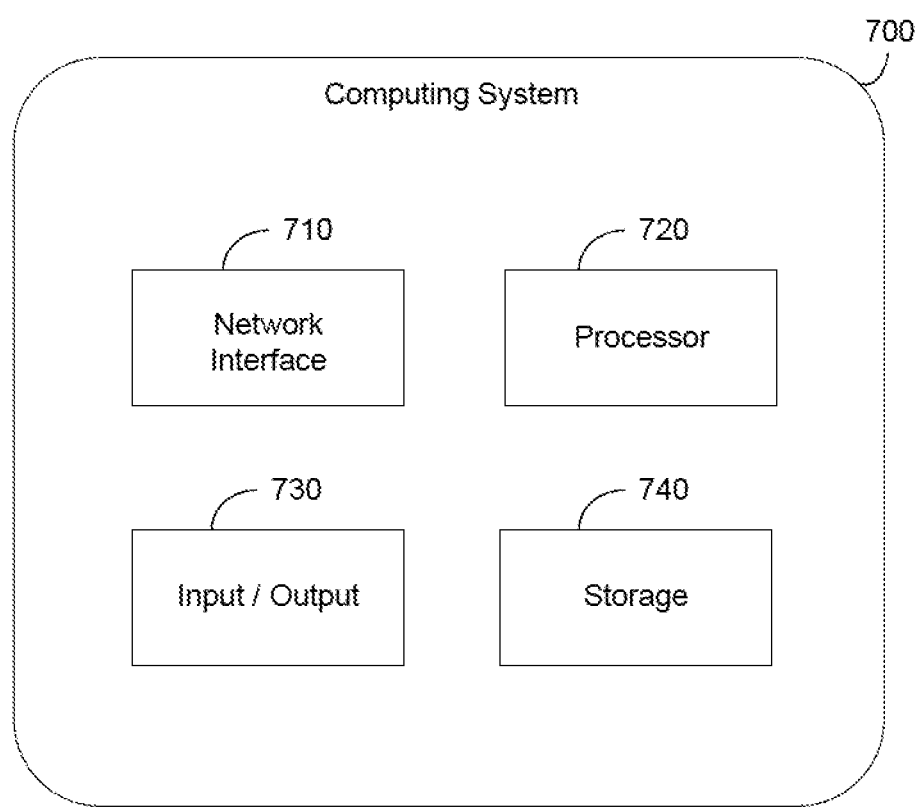
FIG. 7 is a diagram illustrating a computing system for use in the example embodiments described herein.

A storage medium may be coupled to the processor such that the processor may read information from, and write information to, the storage medium. In an alternative, the storage medium may be integral to the processor. The processor and the storage medium may reside in an application specific integrated circuit ("ASIC"). In an alternative, the processor and the storage medium may reside as discrete components. For example, FIG. 7 illustrates an example computing system 700 which may represent or be integrated in any of the above-described components, etc. For example, the computing system 700 may be the host platform, the sender, the recipient, or the like.

FIG. 7 is not intended to suggest any limitation as to the scope of use or functionality of embodiments described herein. The computing system 700 is capable of being implemented and/or performing any of the functionality set forth hereinabove.

The computing system 700 may include a computer system/server, which is operational with numerous other general purpose or special purpose computing system environments or configurations. Examples of well-known computing systems, environments, and/or configurations that may be suitable for use as computing system 700 include, but are not limited to, personal computer systems, server computer systems, thin clients, thick clients, hand-held or laptop devices, tablets, smart phones, databases, multiprocessor systems, microprocessor-based systems, set top boxes, programmable consumer electronics, network PCs, minicomputer systems, mainframe computer systems, distributed cloud computing environments, databases, and the like, which may include any of the above systems or devices, and the like. According to various embodiments described herein, the computing system 700 may be a tokenization platform, server, CPU, or the like.

The computing system 700 may be described in the general context of computer system-executable instructions, such as program modules, being executed by a computer system. Generally, program modules may include routines, programs, objects, components, logic, data structures, and so on that perform particular tasks or implement particular abstract data types. The computing system 700 may be practiced in distributed cloud computing environments where tasks are performed by remote processing devices that are linked through a communications network. In a distributed cloud computing environment, program modules may be located in both local and remote computer system storage media including memory storage devices.

Referring to FIG. 7, the computing system 700 is shown in the form of a general-purpose computing device. The components of computing system 700 may include, but are not limited to, a network interface 710, one or more processors or processing units 720, an input and/or output 730 which may include a port, an interface, etc., or other hardware, for outputting a data signal to another device such as a display, a printer, etc., and a storage device 740 which may include a system memory, or the like. Although not shown, the computing system 700 may also include a system bus that couples various system components including system memory to the processor 720.

The storage 740 may include a variety of computer system readable media. Such media may be any available media that is accessible by computer system/server, and it may include both volatile and non-volatile media, removable and non-removable media. System memory, in one embodiment, implements the flow diagrams of the other figures. The system memory can include computer system readable media in the form of volatile memory, such as random-access memory (RAM) and/or cache memory. As another example, storage device 740 can read and write to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, storage device 740 may include at least one program product having a set (e.g., at least one) of program modules that are configured to carry out the functions of various embodiments of the application.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Although not shown, the computing system 700 may also communicate with one or more external devices such as a keyboard, a pointing device, a display, etc.; one or more devices that enable a user to interact with computer system/server; and/or any devices (e.g., network card, modem, etc.) that enable computing system 700 to communicate with one or more other computing devices. Such communication can occur via I/O interfaces. Still yet, computing system 700 can communicate with one or more networks such as a local area network (LAN), a general wide area network (WAN), and/or a public network (e.g., the Internet) via network interface 710. As depicted, network interface 710 may also include a network adapter that communicates with the other components of computing system 700 via a bus. Although not shown, other hardware and/or software components could be used in conjunction with the computing system 700. Examples include, but are not limited to microcode, device drivers, redundant processing units, external disk drive arrays, RAID systems, tape drives, and data archival storage systems, etc.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described regarding specific examples, it should be understood that various changes, substitutions, and alterations apparent to those skilled in the art can be made to the disclosed embodiments without departing from the spirit and scope of the disclosure as set forth in the appended claims.

What is claimed is:

1. A method comprising:
    extracting, via a software application, message content from electronic messages that are exchanged between a plurality of users of the software application;
    identifying relationships between the plurality of users of the software application based on the electronic messages that are exchanged between the users;
    determining a plurality of appreciation capability values of the plurality of users, respectively, based on the message content;
    embedding a plurality of nodes representing the plurality of users into a graph and interconnecting the plurality of nodes with edges based on relationships between the users and appreciation values;
    inserting the plurality of appreciation capability values into the plurality of nodes, respectively, within the graph;
    receiving a search query for a recommended action;
    querying the graph and identifying one or more other users that have a greater appreciation capability value in the graph;
    retrieving message content of the one or more other users;
    identifying an action to perform based on the retrieved message content; and
    transmitting the action to perform to the user via the software application.

2. The method of claim 1, wherein the extracting comprises extracting message data from one or more of a short message service (SMS) message and an electronic mail (e-mail) based on an application programming interface (API) of the software application.

3. The method of claim 1, wherein the method further comprises dynamically sizing each respective node among the plurality of nodes based on an appreciation capability value determined for an entity represented by the respective node.

4. The method of claim 1, wherein the embedding further comprises embedding nodes representing organizations into the graph, and adding edges between the plurality of nodes and the nodes representing the organizations based on relationship between the plurality of users and the organizations.

5. The method of claim 1, wherein the method further comprises updating an existing node of a target user among the plurality of nodes in the graph based on one or more new messages sent by the target user via the software application.

6. A non-transitory computer-readable medium comprising instructions which when executed by a processor cause a computer to perform a method comprising:
    extracting, via a software application, message content from electronic messages that are exchanged between a plurality of users of the software application;
    identifying relationships between the plurality of users of the software application based on the electronic messages that are exchanged between the users;
    determining a plurality of appreciation capability values of the plurality of users, respectively, based on the message content;
    embedding a plurality of nodes representing the plurality of users into a graph and interconnecting the plurality of nodes with edges based on relationships between the users and appreciation values;
    inserting the plurality of appreciation capability values into the plurality of nodes, respectively, within the graph;
    receiving a search query for a recommended action;
    querying the graph and identifying one or more other users that have a greater appreciation capability value in the graph;
    retrieving message content of the one or more other users;
    identifying an action to perform based on the retrieved message content; and
    transmitting the action to perform to the user via the software application.

7. The non-transitory computer-readable medium of claim 6, wherein the extracting comprises extracting message data from one or more of a short message service (SMS) message and an electronic mail (e-mail) based on an application programming interface (API) of the software application.

8. The non-transitory computer-readable medium of claim 6, wherein the method further comprises dynamically sizing each respective node among the plurality of nodes based on an appreciation capability value determined for an entity represented by the respective node.

9. The non-transitory computer-readable medium of claim 6, wherein the embedding further comprises embedding nodes representing organizations into the graph, and adding edges between the plurality of nodes and the nodes representing the organizations based on relationship between the plurality of users and the organizations.

10. A computing system, comprising:
    a storage device configured to store a graph; and
    a processor configured to
        extract, via a software application, message content from electronic messages that are exchanged between a plurality of users of the software application;
        identify relationships between the plurality of users of the software application based on the electronic messages that are exchanged between the users;
        determine a plurality of appreciation capability values of the plurality of users, respectively, based on the message content;
        embed a plurality of nodes representing the plurality of users into the graph and interconnect the plurality of nodes with edges based on relationships between the users and appreciation values;
        insert the plurality of appreciation capability values into the plurality of nodes, respectively, within the graph;
        receive a search query for a recommended action;

query the graph and identify one or more other users that have a greater appreciation capability value in the graph;

retrieve message content of the one or more other users;

identify an action to perform based on the retrieved message content; and transmit the action to perform to the user via the software application.

11. The computing system of claim 10, wherein the processor is configured to extract message data from one or more of a short message service (SMS) message and an electronic mail (e-mail) based on an application programming interface (API) of the software application.

12. The computing system of claim 10, wherein the processor is configured to dynamically size each respective node among the plurality of nodes based on an appreciation capability value determined for an entity represented by the respective node.

13. The computing system of claim 10, wherein the processor is configured to embed nodes representing organizations into the graph, and add edges between the plurality of nodes and the nodes representing the organizations based on relationship between the plurality of users and the organizations.

14. The computing system of claim 10, wherein the processor is configured to update an existing node of a target user among the plurality of nodes in the graph based on one or more new messages sent by the target user via the software application.

* * * * *